United States Patent
Oh et al.

(10) Patent No.: US 10,127,078 B2
(45) Date of Patent: Nov. 13, 2018

(54) AUTOMATIC CROSS-DATA CENTER ROTATION OF ACTIVE PROCESSES

(71) Applicant: Microsoft Technology Licensing, LLC, Redmond, WA (US)

(72) Inventors: Yingfeng Oh, Cupertino, CA (US); Edward Wu, Fremont, CA (US); Dominic Law, Sunnyvale, CA (US); Xiaokang Zhang, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 15/362,613

(22) Filed: Nov. 28, 2016

(65) Prior Publication Data

US 2018/0150316 A1    May 31, 2018

(51) Int. Cl.
*G06F 11/00* (2006.01)
*G06F 9/48* (2006.01)
*G06F 11/07* (2006.01)

(52) U.S. Cl.
CPC ............ *G06F 9/485* (2013.01); *G06F 11/076* (2013.01); *G06F 11/0721* (2013.01)

(58) Field of Classification Search
CPC ............... G06F 11/0721; G06F 11/076; G06F 9/46–9/5055
See application file for complete search history.

(56) References Cited

U.S. PATENT DOCUMENTS

| | | | |
|---|---|---|---|
| 9,569,255 B1* | 2/2017 | Johnson | G06F 9/4887 |
| 2010/0218186 A1* | 8/2010 | Wolfe | G06F 9/4856 718/100 |
| 2016/0292011 A1* | 10/2016 | Colson | G06F 9/5044 |
| 2018/0143854 A1* | 5/2018 | Kumar | G06F 9/505 |

* cited by examiner

*Primary Examiner* — Michael Maskulinski
(74) *Attorney, Agent, or Firm* — Hickman Palermo Becker Bingham LLP; Daniel D. Ledesma

(57) ABSTRACT

Techniques for rotating leadership among processes in multiple data centers are provided. A first process of a program in a first data center determines whether the first process is a leader process among multiple processes of the program. Each process of the multiple processes executes in a different data center of the multiple data centers. In response to determining that the first process is the leader process, the first process performs a particular task. After performing the particular task, the first process causes leadership data to be updated to indicate that the first process is no longer the leader process. After the leadership data is updated, a second process (of the multiple processes) in a second data center determines whether the second process is the leader process. The second process performs the particular task only if the second process determines that the second process is the leader process.

20 Claims, 6 Drawing Sheets

AUTOMATIC CROSS-DATA CENTER ROTATION OF ACTIVE PROCESSES

CROSS-REFERENCE TO RELATED APPLICATIONS

This application is related to U.S. application Ser. No. 15/370,143, filed on Dec. 6, 2016 and U.S. application Ser. No. 15/370,190 filed on Dec. 6, 2016.

TECHNICAL FIELD

The present disclosure relates to multi-data center management and, more particularly, to automatic rotation of active processes across multiple data centers.

BACKGROUND

Some companies and organizations employ data centers to address significant user demand for online content and services. A data center is a facility used to house computer systems and associated components, such as telecommunications and storage systems. A data center may include redundant or backup power supplies, redundant data communications connections, environmental controls (e.g., air conditioning, fire suppression), and various security devices. A data center may contain multiple computing devices hosting services that are client-facing (or that are used to respond directly to client requests) and services that are internal-facing (or that are used to respond to requests from components within the data center itself or from another affiliated data center).

Some companies employ multiple data centers to serve online content and services to end-users. However, different groups of data centers may operate under different paradigms. For example, in one paradigm, different data centers in a group host different content and/or services. Thus, for example, a piece of content is assigned to a first data center in a group and, while external requests for that piece of content may be handled by all data centers in the group, each data center forwards the external requests to the first data center.

In a different paradigm, multiple data centers in a group host the same content and/or services. Thus, all data centers have local access to certain data and services and, accordingly, may individually handle external requests without relying on communicating with other data centers in the group. In this way, data centers may be distributed globally, which results in lower latency for end-users of a data center.

Even in this latter paradigm, however, there may be operations that only a single data center in a group should perform even though multiple data centers in the group may be configured to perform those operations. A reason for restricting the performance of certain operations to a single data center may be due to the nature of the content. However, copying content across multiple data centers may help in case one data center becomes unavailable, such as in response to an unplanned failure or in response to a planned shutdown, which may be performed for various maintenance reasons. Another data center in the group can take over as the "home" data center for those operations.

One problem with only a single home data center performing certain operations is that a failover data center will need to take over for the home data center if/when the home data center becomes unavailable. The failover other data center may not perform the operations properly for any number of reasons which will not be discovered until after the failover home data center actually performs those operations. When a failure in performing the operations is detected in the failover home center, a significant amount of time may be needed to discover the cause(s) of the failure. Thus, it is possible that the operations may not be performed by any data center for a significant amount of time until the failure's causes are discovered and resolved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically rotating among different processes of a program in a multi-data center system are provided. Each data center runs a program that is configured to perform a particular task or set of operations. A first process (of the program) in a first data center determines whether the first process is a leader process among the multiple processes executing in the different data centers. At or around the same time, a second process (of the program) in a second data center similarly determines whether the second process is the leader process. Whichever process is the leader process performs the particular task and eventually relinquishes leadership so that another process in another data center automatically becomes the leader process and later performs the particular task.

In one approach, the leader process rotates among the multiple data centers automatically and frequently. Frequent rotating validates that the process and other components in each data center are working properly, which increases the reliability of the overall data center system before any actual data center failure occurs when one data center has to be taken offline. If leadership does not rotate among the multiple data centers, then those other data centers will never be tested. If one of those data centers eventually hosts a leader process, that leader process might fail in some way. Identifying a problem in a data center before that data center takes over for a failed data center is very important.

System Overview

Figure 1:
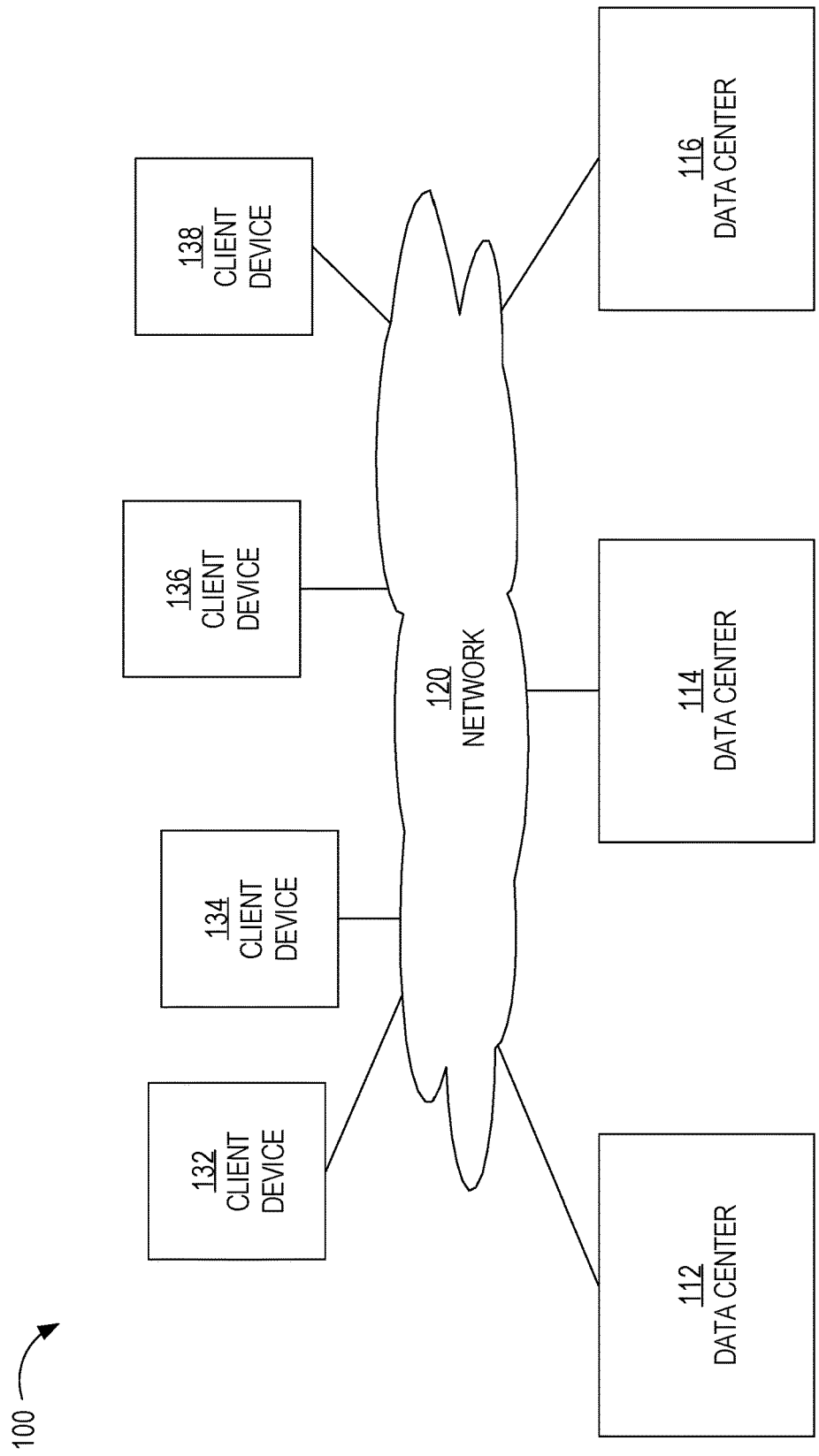
FIG. 1 is a block diagram that depicts a system comprising multiple data centers, in an embodiment.

FIG. 1 is a block diagram that depicts a system 100 comprising multiple data centers, in an embodiment. System 100 comprises data centers 110-116, network 120, and client devices 132-138. Although three data centers are depicted, system 100 may include any number of two or more data centers. Also, although only four client devices are depicted, system 100 may include any number of two or more client devices.

Network 120 may be implemented on any medium or mechanism that provides for the exchange of data between client devices 132-138 and data centers 110-116. Network 120 may comprise multiple networks, such as one or more Local Area Networks (LANs), one or more Wide Area Networks (WANs), Ethernet or the Internet, and/or one or more terrestrial, satellite or wireless links. In an embodiment, data centers 110-116 are connected to each other using one or more dedicated lines or links instead of over multiple networks or the Internet. Such dedicated lines allow for the relatively fast transmission of data between data centers 110-116.

Each client device 132-138 is a computing device. Examples of computing devices include a laptop computer, a tablet computer, a smartphone, a desktop computer, and a personal digital assistant (PDA), and a wearable device. Each client device executes an application. An example of an application includes a dedicated application (e.g., a "smartphone app") that is installed and executed on a local computing device and that is configured to communicate with one of data centers 110-116 over network 120. Another example of an application is a web application that is downloaded (e.g., from one of data centers 110-116) and that executes within a web browser running on a client device.

Data Centers

Although depicted as a single element, each of data centers 110-116 may comprise multiple computing elements and devices, connected in a local network or distributed regionally across multiple networks, such as the Internet. A computing device within a data center may host multiple applications and multiple computing devices within a data center may host different instances of the same set of applications.

For example, each data center may include an account database that comprises information about multiples accounts. Some accounts may be associated with a single registered user while other accounts may be associated with multiple registered users. An account database may be stored on one or more storage devices (persistent and/or volatile) that may reside within the same local network as the corresponding data center.

In a social networking context, data centers 110-116 are provided by a social network provider, such as LinkedIn, Facebook, or Google+. In this context, each user account in an account database includes a user profile, each provided by a different user. A user's profile may include a first name, a last name, a digital image of the user, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include applying to certain jobs, views of j ob postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, or colleague of the user.

Applications or services executing within a data center may prompt users to provide profile information in one of a number of ways. For example, an application may have provided a web page with a text field for one or more of the above-referenced types of information. In response to receiving profile information from a user's device, one or more of data centers 110-116 stores the information in an account that is associated with the user and that is associated with credential data that is used to authenticate the user to one of data centers 110-116 when the user attempts to log into his/her account at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In the content delivery context, data centers 110-116 support a content delivery campaign management system that allows content providers to create campaigns to deliver content to users who interact with data centers 110-116 directly or indirectly through one or more publishers and one or more content exchanges that request content from the content delivery campaign management system. An example type of content that the content delivery campaign management system provides to end-users is advertisements.

The type of data stored in each data center or the type of tasks that are performed by each data center are tangential to how leadership among processes in different data centers is automatically changed.

Example Method

Figure 2:
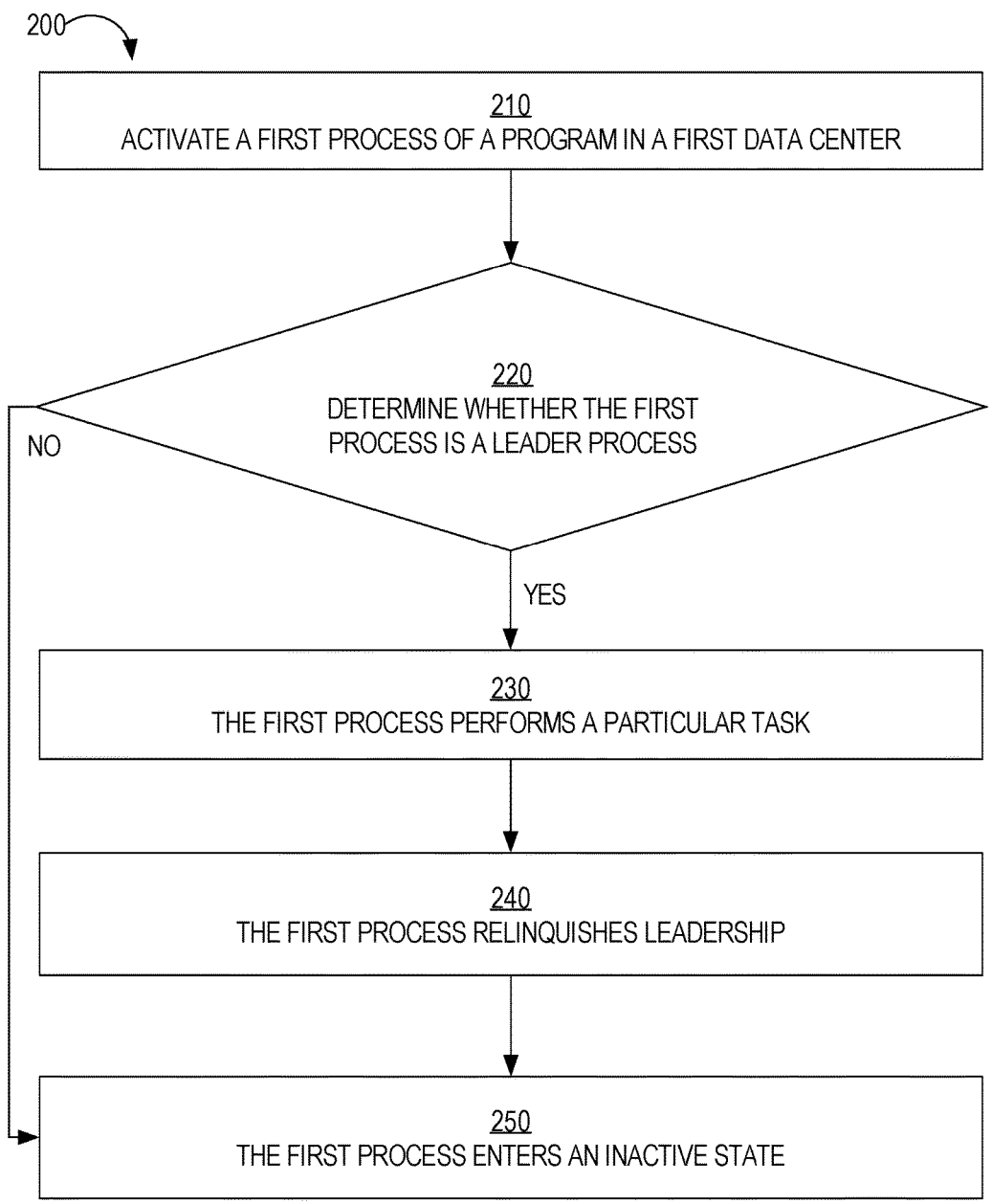
FIG. 2 is a flow diagram that depicts a method for rotating leadership among processes of a program executing in different data centers, in an embodiment.

FIG. 2 is a flow diagram that depicts a method 200 for rotating leadership among process of a program executing in different data centers, in an embodiment.

At block 210, a first process of a program in a first data center is activated. The program is implemented in multiple data centers. Each program in each data center may be executing simultaneously but only one process (i.e., the leader process) may be active at a time.

A timer, a signal, or interrupt may cause the first process to become activated. Prior to activation, the first process may be in a sleep mode.

At block 220, the first process determines whether the first process is a leader process among multiple instances of the first process. If the decision in block 210 is in the affirmative, then method 200 proceeds to block 230; else, method 200 proceeds to block 250.

At block 230, the first process performs a particular task that may involve multiple operations indicated in the program.

At block 240, the first process relinquishes leadership. Block may involve the first process causing leadership data to be updated to indicate that the first process is no longer the leader process. Block 240 may be indicated in code of the program. For example, the program code may indicate that whenever a process completes the particular task, the process relinquishes leadership. As another example, the program code may indicate that the process is to be a leader for at least three rounds (i.e., performing the particular task three times before a process in another data center performs the particular task).

At block 250, the first process goes to sleep or enters an inactive state where the no code associated with the program (or at least with the particular task) is executed. The first process may be in an inactive state until another process sends a signal that causes the first process to enter an active state.

Method 200 may be followed by each process of the program in each data center. Additionally, different programs (each implemented in each data center) may follow the same model of behavior: wake up, check leadership, perform a task, relinquish leadership, and go to sleep. The main difference between the programs is the task that is performed.

Data Center Components

Figure 3:
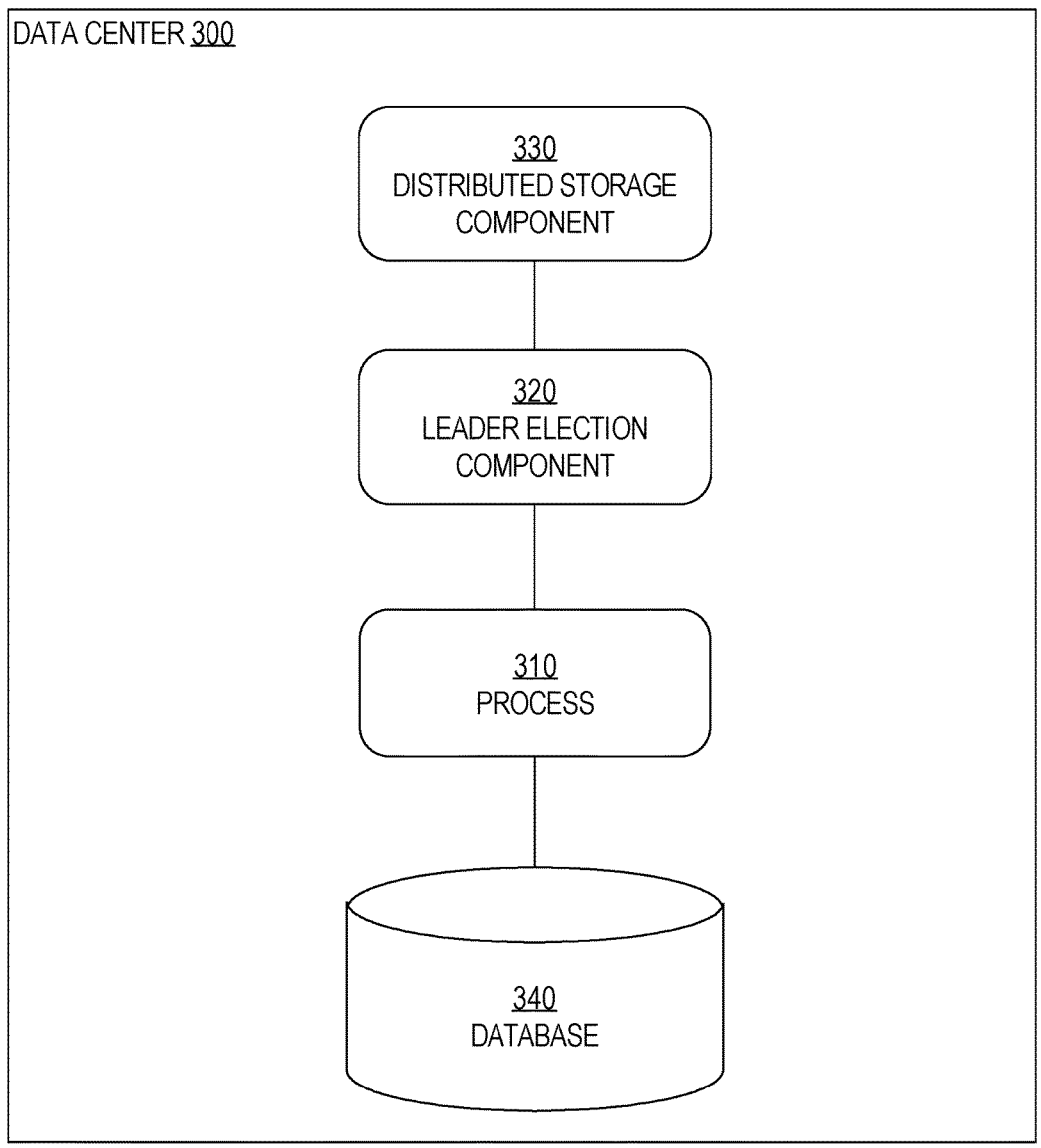
FIG. 3 is a block diagram of various components of a data center, in an embodiment.

FIG. 3 is a block diagram of various components of a data center 300, in an embodiment. Data center 300 may be any one of data centers 112-116. Data center 300 includes a process 310, a leader election component 320, a distributed storage component 330, and database 340.

Process 310 is a program under execution, where a program is a set of executable instructions. A program may initially be composed by a user in a high level programming language, such as Java, C++, or Perl. Later, a compiler compiles the program into a set of instructions according to an assembly language that is recognizable by an interpreter, which is the component that executes the compiled instructions.

Process 310 is configured to perform a particular task that comprises one or more operations, possibly thousands of operations. Some operations may involve calling functions of other programs that are statically or dynamically linked. Some operations may involve retrieving data from database 340 and/or data from one or more other sources that are within, outside of, or remote to, data center 300.

An example of a task that process 310 is configured to perform is determining an amount to charge each content provider of multiple content providers for delivering creatives of their respective content delivery campaigns. Such a task may be performed regularly (e.g., daily) at a particular time. Such a task may be critical to the ongoing operation of the enterprise in which the entity that owns the data maintained by data centers 112-116 is engaged.

Database

Database 340 may be implemented on one or more storage media. Examples of database 340 include a relational database, an object-relational database, and a No SQL database. Database 340 includes information about multiple entities, such as accounts, campaigns, creatives, or other types for which objects or data structures are created. An instance of database 340 is maintained in each data center in a group of data centers in case any one data center in the group fails or becomes otherwise unavailable. Thus, changes that are made to database 340 are applied or replicated to each corresponding database in the other data centers. For example, an entity may be a content delivery campaign and example changes to the content delivery campaign include an update to a budget of the content delivery campaign, a deactivation of the content delivery campaign, or a resuming of a paused content delivery campaign.

Embodiments are not limited to any particular technique for replicating, to one or more other data centers, changes made to database 340. One example technique is implemented by Oracle's GoldenGate. Change replication may be implemented in a database layer that is separate from the processing layer (where one or more processes such as process 310 perform one or more tasks) that is described herein.

While FIG. 3 only depicts a single database 340, data center 300 may include multiple databases. Each database may contain data about different types of entities. For example, one database includes data about creatives, another database includes data about content delivery campaigns (each of which may include multiple creatives), and another database includes data about accounts (each of which may include multiple content delivery campaigns).

Leader Election Component

Leader election component 320 determines whether process 310 is currently a leader process among multiple "sibling" processes in other data centers. For example, an instance of process 310 may be executed in each of data centers 112-116. If process 310 is in data center 112 and leader election component 320 determines that process 310 is the leader process, then instances of process 310 in data centers 114 and 116 are not leader processes and, therefore, are "asleep" or are in an inactive state. Each of instances of process 310 in data centers 114 and 116 may execute for only as long as it takes to determine that the instance is not a leader process and then go dormant or inactive (i.e., without performing a particular task) until the instance is woken up or activated again at a later time. Conversely, if leader election component 320 determines that process 310 is not the leader process, then an instance of process 310 executing in one of data centers 114-116 is the leader process.

Leader election component 320 is a component that the program of process 310 implements or calls at runtime. Leader election component 320 may be part of the program of process 310. Alternatively, leader election component 320 comprises library code. A library is a collection of implementations of behavior, written in terms of a language, that has a well-defined interface by which the behavior is invoked. For instance, software developers who want to write a higher level program can use a library to make system calls instead of implementing those system calls over and over again. In addition, the behavior is provided for reuse by multiple independent programs. A program invokes the library-provided behavior via a mechanism of the language. For example, in a simple imperative language such as C, the behavior in a library is invoked by using C's normal function-call. What distinguishes the call as being to a library versus being to another function in the same program is the way that the code is organized. Library code is organized in such a way that the library code can be used by multiple programs that have no connection to each other, while code that is part of a program is organized to be used only within that program. Also, the developer of the program does not need to implement the library code. Rather, the developer of the program merely ensures that the library code is linked to the program at compile time or runtime.

Whether implemented within the program or separately as library code, leader election component 320 is implemented once per program. For example, if there are multiple programs that rely on a leader election component, each of those programs is configured to call a different instance of the leader election component.

Alternatively, leader election component 320 may be implemented as a service that is separate from process 310 and that process 310 is configured to call. In this way, if there are multiple processes of different programs within data center 300, each process may call leader election component 320 and, depending on the type of call, receive an appropriate result. Because a single leader election component 320 is relied upon by different programs within the same data center, a call to leader election component 320 includes configuration data that indicates the program that initiated the call. Leader election component 320 uses the configuration data when interacting with distributed storage component 330, which is described in more detail below.

Distributed Storage Component

Distributed storage component 330 stores data that is shared among multiple data centers. An example of such shared data is leadership data that indicates which process (of multiple processes in different data centers) is the current leader process for a particular program that is implemented in the data centers. The processes of the particular program (executing in the different data centers) are referred to herein as a "process group." Examples of implementations of leadership data include a table, a vector, an array, and a linked list.

Distributed storage component 330 is implemented in software, hardware, or any combination of software and hardware. A different instance of distributed storage component 330 runs/resides in each data center of multiple data centers. Distributed storage component 330 is able to communicate with one or more other instances of distributed storage component 330 so that any changes made to shared data in one data center is replicated to each other data center.

An example of distributed storage component 330 is Apache Zookeeper, which is a distributed hierarchical key-value store and provides a distributed configuration service, synchronization service, and naming registry for large distributed systems. ZooKeeper's architecture supports high availability through redundant services. Thus, clients of a Zookeeper instance can ask another ZooKeeper leader if the first fails to answer. ZooKeeper nodes store data in a hierarchical name space, similar to a file system or a tree data structure. Clients can read from and write to ZooKeeper nodes and, in this way, have a shared configuration service.

In an embodiment, distributed storage component 330 maintains leadership data for multiple process groups, each corresponding to a different program. Thus, for example, leadership data for program A may indicate that a corresponding process in data center 112 is a leader process while leadership data for program B may indicate that a corresponding process in data center 116 is a leader process.

Requests to the Distributed Storage Component

Leader election component 320 is configured to send requests to distributed storage component 330. Examples of types of requests (or calls) include registering with distributed storage component 330, retrieving leadership data, updating leadership data, and deregistering from distributed storage component 330.

For example, at program start up, process 310 reads configuration data that is associated with all instances of process 310 in the various data centers. The configuration data may be data that uniquely identifies the program that runs in each of the data centers. Additionally or alternatively, the configuration data is used as a unique namespace in distributed storage component 330. Process 310 then calls leader election component 320 to register with distributed storage component 330, passing the configuration data as a parameter. Alternatively, process 310 calls leader election component 320 to register and, in response, leader election component 320 reads the configuration data (i.e., without process 310 passing the configuration data to leader election component 320). In either situation, leader election component 320 transmits the configuration data (and, optionally, data center indication data that indicates the data center in which leader election component 320 is located) to distributed storage component 330.

Distributed storage component 330 may maintain a list of configuration data instances where each instance of configuration data is associated with a storage location where associated leadership data is stored. For example, configuration data A indicates program A and is associated with leadership data A, which is stored at storage location A; configuration data B indicates program B and is associated with leadership B, which is stored at storage location B.

Distributed storage component 330 uses received configuration data to either create new leadership data or update existing leadership data. For example, if distributed storage component 330 determines that the received configuration data has not been received before or that no instances of leadership data is associated with received configuration data (i.e., that identifies or is associated with a particular program), then distributed storage component 330 creates leadership data and associates the leadership data with the received configuration data. Creating leadership data may involve (1) creating a data structure (e.g., an array) that has the same number of entries as there are data centers and (2) writing, to one of the entries (e.g., the first entry in the array), data that is associated with (e.g., identifies) the data center that sent the configuration data. Because each instance of distributed storage component 330 operates in a different data center, each instance may store (or have access to) data that indicates that data center. Thus, distributed storage component 330 might not require data center indication data from leader election component 320.

If distributed storage component 330 determines that an instance of leadership data is associated with received configuration data, then distributed storage component 330 updates the leadership data depending on the call/request from leader election component 320. For example, if the call is to deregister, then distributed storage component 330 removes, from the associated leadership data, an indication of the data center from which the call was received. A "de-registration" indicates that the associated program (of process 310) is no longer participating in the election process with respect to that program.

If the call is to register to an existing process group, then distributed storage component 330 identifies the leadership data associated with the configuration data and updates the leadership data. Registering may happen simultaneously for multiple processes in a process group. To avoid creating leadership data at the same time in each data center, one process may be configured to "wake up" or become activated before corresponding processes in other data centers. For example, processes in data center 112 may wake up one minute before processes in data centers 114-116. If leader election is based on time of registration, then process(es) in data center 112 may always (or consistently) be the initial leader process(es).

If the call is to relinquish leadership from an existing process group, then distributed storage component 330 identifies the leadership data associated with the configuration data and updates the leadership data by removing an indication of process 310 (or of data center 300) from the leadership data. For example, if leadership data is a linked list, then distributed storage component 330 (1) identifies, in the linked list, a node that identifies process 310 or data center 300 and (2) removes the node from the linked list.

How leadership data is updated may vary depending on how leadership data is implemented. For example, if leadership data is implemented as a linked list with FIFO characteristics, then, when a process registers with distributed storage component 330 (and, indirectly, with a process group), a node is created, an indication of the data center in which the process executes is added to the node, and the node is appended to the linked list. A timestamp may also be added to the node indicating when the process registered. If a leader process relinquishes its leadership, then the corresponding node in the linked list may be moved from the front of the linked list to the back of the linked list. Similarly, if leadership data is implemented as a vector, then, when a leader process relinquishes leadership, an entry (for the leader process) at the "head" of the vector is moved to the "tail" of the vector. The new "head" of the vector indicates in which data center the new leader process resides.

As another example, if leadership data is implemented as a table, then each process may be associated with a different row in the table and a column of the table may include timestamps of when each process registered or when each process last relinquished leadership. The process that is associated with the lowest (or earliest) timestamp may be selected as the leader of the corresponding process group. Thus, if a leader process relinquishes its leadership, then the row corresponding to the process may be updated to include a current timestamp. The process with the oldest timestamp will become, when activated, the new leader process.

In an embodiment, a data center comes online and each leader election component in the data center communicates with its respective distributed storage component to update the leadership data that corresponds to the leader election component.

In an embodiment, a data center becomes unavailable, which may be planned or unplanned. Distributed storage component 330 may determine that another data center is unavailable or offline by, for example, being notified by another process within data center 300 or detecting that the unavailable data center is no longer responding to heartbeat messages that are transmitted regularly to each data center in a data center group. In response to the determination, distributed storage component 330 identifies one or more instances of leadership data to update to remove an indication of processes from the failed data center. For example, if programs X and Y that are executing in each data center and one data center fails, then distributed storage component 330 identifies (1) first leadership data for program X and removes an indication of the failed data center from the first leadership data and (2) second leadership data for program Y and removes an indication of the failed data center from the second leadership data.

In a related embodiment, one or more specific calls are made to distributed storage component 330 (e.g., by a process other than leader election component 320) to delete entries, in each instance of leadership data, corresponding to an unavailable data center. In this way, no leader election component in an available or online data center will see any indication of the unavailable data center. Thus, a process in the unavailable data center will not be selected as a leader process.

Rotating Leadership Among Processes in a Process Group

Leader election component 320 may implement one or more leader election techniques to allow for different instances of a process to be a leader over a period of time.

One leader election technique is a round-robin technique where each process in a process group is a leader at a different time. For example, processes A, B, C, and D become leader processes in that order. When process D relinquishes leadership, process A becomes the next leader. If another process (due to another data center coming online) is added to the process group, then that process may be leader after process D (regardless of which process is the current leader) or after the current leader process relinquishes leadership. For example, if process B is the current leader process when process E is added to the process group, then process E may become leader after process D or after process B. If a process is removed from the process group (e.g., due to the corresponding data center going offline), then an existing process may become a leader process sooner than the process would if the removed process remained in the process group. The round-robin approach is continued.

One aspect of the round-robin technique is that each process may perform one or more tasks before relinquishing leadership. For example, when each of process A, B, C, and D is the current leader and performs a particular task, then that process relinquishes leadership. As another example, each leader process performs the particular task multiple times (e.g., five times) and then relinquishes leadership.

One variation of the round-robin technique is that some processes may perform a particular task more than others. For example, the data center in which process A executes is considered a "home" data center for the corresponding program. Thus, when process A is the current leader, process A performs a particular task three times before relinquishing leadership. However, when each of processes B, C, and D become the current leader, then that process only performs the particular task one time and then relinquishes leadership.

A different, but related leader election technique is a random number generation technique where each leader election component generates a random number. The random number generation is deterministic but random in nature.

Performance-Based Relinquishing of Leadership

In an embodiment, when to relinquish leadership is based on results of a particular task that a current leader process performs. For example, if process A performs the particular task and a result of the performance indicates a performance level that is below a particular threshold, then process A relinquishes leadership and process B eventually becomes the new leader process. Examples of a result include a failure to complete the particular task, one or more exceptions generated during performance, and one or more errors detected. For example, if more than 20 errors are identified during performance of the particular task, then the current leader process relinquishes leadership and another process (i.e., in another data center) is activated and becomes the new leader. Errors or exceptions may arise not only when performing the particular task, but also when reading data from one or more data sources and/or when writing data to one or more other data sources. For example, a failure may arise when attempting to access a database upon which the leader process relies when performing the particular task.

In a related embodiment, a particular failure/error/exception threshold varies depending on one or more factors, such as number of entities or accounts that are processed during performance of the particular task. For example, the number of accounts that need to be billed at a particular time depends on which content items were presented during a previous time period. Thus, some days, the number of accounts may be relatively high, such as a few thousand, while other days, the number of accounts may be relatively low, such as a few hundred. Thus, the particular threshold may be a percentage of the number of accounts, such as 1% or 5%. For example, if the number of errors (each error pertaining to a different account) is greater than 1%, then the current leader process relinquishes leadership and another process (i.e., in another data center) becomes the new leader.

In some situations, a current leader process performs only a part of a particular task or some errors are generated/detected when performing a part of the particular task. In these situations, the current leader process may relinquish leadership and allow another process to perform the particular task or a portion thereof. Thus, the new leader process may perform (a) the entirety of the particular task or (b) only the part of the particular task that (1) the previous leader process did not perform or (2) experienced the error(s). For example, if a particular task required updating account information in one thousand accounts and errors were detected for 20 accounts, then a new leader process may perform the particular task only with respect to the 20 accounts. In this scenario, the results pertaining to accounts that are not associated with errors are retained or permanently stored (and, optionally, automatically replicated to other data centers through a database replication technique). Alternatively, the new leader process may perform the particular task for all one thousand accounts. In this scenario, the results generated by the previous leader process may be ignored and discarded.

In an embodiment, frequency of leader election is different for different programs or process groups. For example, program X is woken up three times per day and program Y is woken up once per day. The frequency of leader election of even a single program may change based on performance. For example, program X is woken up once per day unless a failure occurs or a certain number of errors are detected on a particular day. In such cases, program X is woken up multiple times on that particular day.

In a related embodiment, instead of the leader process performing the determination on whether to relinquish leadership based on performance, another process may make the determination. The other process analyzes performance data that is generated based on the leader process performing the particular task and, for example, compares the performance data to threshold performance data.

Another leader election technique is a load-based technique where the data center with the lowest load is selected as the current leader. Examples of "load" include usage of one or more CPUs in a data center, usage of volatile memory in the data center, usage of network resources, and CPU and/or memory usage by all or certain services/applications/programs in the data center. For example, if service A in data center 112 (that process 310 relies on to perform certain calculations) is being heavily used relative to service A in data center 114, then a corresponding process in data center 114 is more likely to be selected as a leader process.

Load may include absolute load or relative load. For example, while data center 112 may have the most available computing resources at a particular point in time (which may be due to data center 112 having the most computing resources among all data centers 112-116), data center 114 may have the lowest percentage load among data centers 112-116. If absolute load is a basis for leader election, then a process in data center 112 would most likely be selected as a leader process. If relative load is a basis for leader election, then a corresponding process in data center 114 would most likely be selected as the leader process.

One way to implement a load-based technique is for each process in a process group to "wake up" at the same time and report respective load data to their respective distributed storage component (e.g., via their respective leader election component). Then, each leader election component checks with its respective distributed storage component some time later (e.g., one minute) to determine which data center is least loaded. The leader election component in the least loaded data center then reports back to the corresponding process to indicate that the corresponding process is the current leader.

More sophisticated leader election techniques may be implemented, including combining different leader election techniques. For example, one leader election technique may be used during a first period of time and another leader election technique may be used during a second period of time. For example, initially a load-based technique is implemented in choosing an initial order of data centers and then a round-robin technique is implemented thereafter. As another example, a round-robin technique is implemented only if there are sufficient computer resources to perform the particular task; else a load-based technique is implemented. As another example, a load-based technique is implemented initially and each time a process is not selected as a leader process, a weighting factor for that process is increased. The greater the weighting factor, the more likely the process will be selected as a leader process. Thus, if a process has not been selected after ten times and there are only three data centers, then the relatively high weighting factor will make it more likely that the process is selected the next time leadership is determined.

Example Method

Figure 4A:
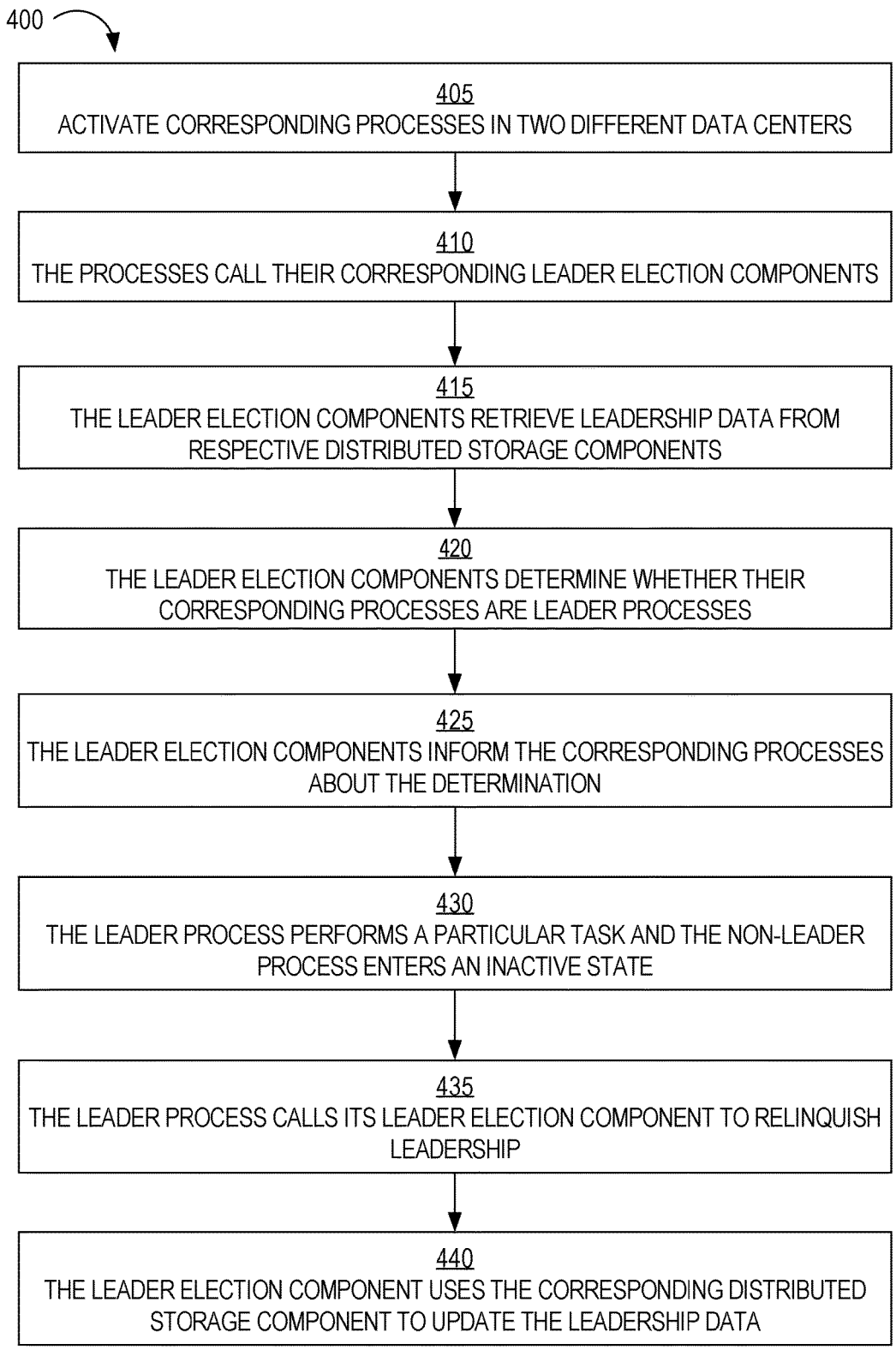
FIG. 4A is a flow diagram that depicts a method for rotating leadership between at least two processes in different data centers, in an embodiment.
Figure 4B:
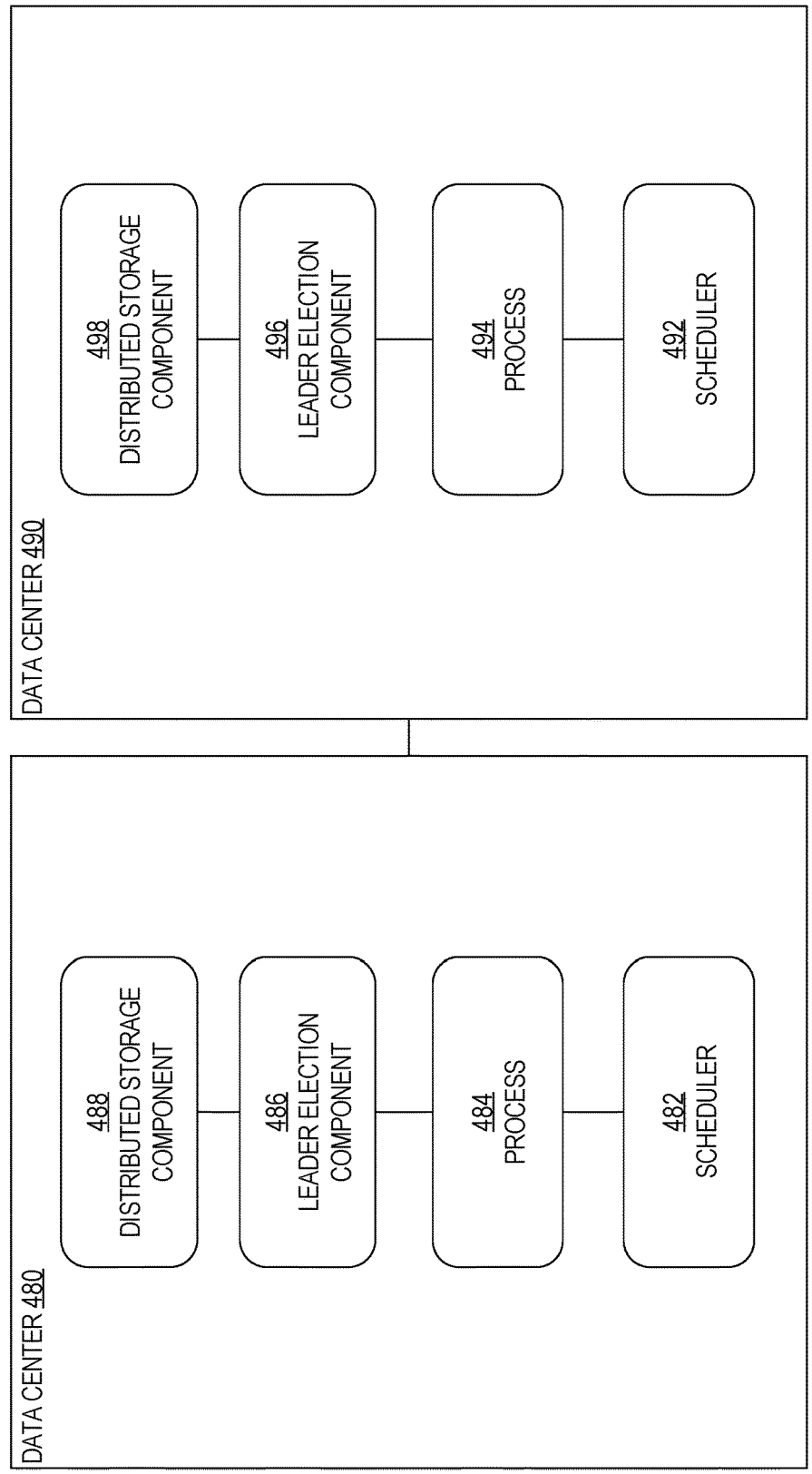
FIG. 4B is a block diagram that depicts components of two data centers, in an embodiment.

FIG. 4A is a flow diagram that depicts a method 400 for rotating leadership between at least two processes in different data centers, in an embodiment. Method 400 is described in the context of FIG. 4B, which is a block diagram that depicts two data centers 480 and 490, in an embodiment. While each data center is depicted as hosting a single process that can be a leader process, each data center may host multiple processes, each of which may be a leader process with respect to other processes in other data centers. Also, although only two data centers are depicted in FIG. 4B, other embodiments may have more data centers.

At block 405, each process in each data center is activated. Each of data centers 480 and 490 include a scheduler: scheduler 482 in data center 480 and scheduler 492 in data center 490. Each scheduler is a process that is configured to "wake up" or cause another process to enter an active state and begin executing. Thus, scheduler 482 wakes up process 484 and scheduler 492 wakes up process 494.

As noted above, each process in a process group may be woken up if a previous execution by a leader process of the process group experienced a performance issue, such as a failure or one or more errors, when performing a particular task (e.g., on the same day). If the leader process did not experience a negative performance issue, then schedulers 482 and 492 will not wake up their respective processes until, for example, the next day. Conversely, if the leader process did experience a negative performance issues, then schedules 484 and 492 will wake up their respective processes for a subsequent iteration, for example, on the same day.

At block 410, the processes call their respective leader election components. Thus, process 484 calls leader election component 486 and process 494 calls leader election component 496. A call to a leader election component may be a register type of call if the corresponding process is not currently registered with a distributed storage component. Alternatively, a call to the leader election component may be a leadership check type of call where the corresponding process is already so registered.

At block 415, the leader election components 486 and 496 use configuration data to retrieve, respectively, from distributed storage components 488 and 498, any leadership data associated with the configuration data. The leader election components 486 and 496 may have received the configuration data, respectively, from processes 484 and 494. Alternatively, leader election components 486 and 496 may have access to the configuration data independent of processes 484 and 494.

Block 415 may involve leader election components 486 and 496 calling, respectively, distributed storage components 488 and 498 and passing the configuration data as part of the call. In response, distributed storage components 488 and 498 return leadership data that is associated with the configuration data.

At block 420, each of leader election components 486 and 496 determines whether the respective process is a leader process. If designed properly, both leader election components 486 and 496 do not make a positive determination. In this example, the leadership data indicates that process 484 is the leader process. The leadership data may have been updated previously to indicate process 484 as the leader process.

At block 425, leader election component 486 informs process 484 that process 484 is the leader process and leader election component 496 informs process 494 that process 494 is not the leader process. Process 494 is not required to know who the leader process is.

At block 430, process 494 enters an inactive state and process 484 performs a particular task. Thus, process 494 performs no further action until process 494 is "woke up" again, whereas process 484 continues to execute the instructions in the corresponding program.

At block 435, after process 484 performs the particular task, process 484 issues a particular call, to leader election component 486, indicating that process 484 is no longer a leader process. Block 435 may occur immediately after performing the particular task or may be performed after determining whether one or more criteria are satisfied. For example, one criterion for relinquishing leadership is performing the particular task a particular number of times while being the leader process for a contiguous period of time. As another example, one criterion for relinquishing leadership is a determination that a certain number of errors have, or a certain type of error has, occurred.

At block 440, leader election component 486 retrieves, from distributed storage component 488, leadership data that is associated with process 484 and updates the leadership data to indicate that process 484 is no longer a leader process. The update may result in the leadership data indicating a different process (or data center) as the leader process (or the leader data center with respect to the corresponding program). For example, if a timestamp is associated with each process or data center indicated in the leadership data, then the timestamp of process 484 (or of data center 480) is updated to a current time, which will be later than the timestamp of process 494 (or of data center 490).

Block 440 involves the update being applied to each other instance of the leadership data that resides in each data center other than data center 480, including data center 490.

Later, when processes 484 and 494 are activated and leader election components 486 and 496 check the leadership data, leader election component 486 will determine that process 484 is not the leader process and leader election component 496 will determine that process 494 is the leader process, unless there are other eligible data centers not depicted in FIG. 4B, one of which may be the current leader process.

Benefits

A data center may be made up of thousands of components, networks, elements, etc., and programs executing in a data center may rely upon multiple underlying systems for services. Thus, the potential or probability of a failure occurring somewhere in the data center increases over time. According to some embodiments described herein, because of constant and automatic rotation of processes in different data centers, a way is provided for a program to run in virtual perpetuity. Thus, each data center is regularly tested with respect to a particular task. If any data center experiences problems/errors/exceptions while the particular task is performed, then that data center may be examined more closely to find a potential fix. In the meantime, another data center may automatically take over and perform the particular task. If all data centers are experiencing similar problems, then a solution may be in the logic of the program or in the input data itself.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
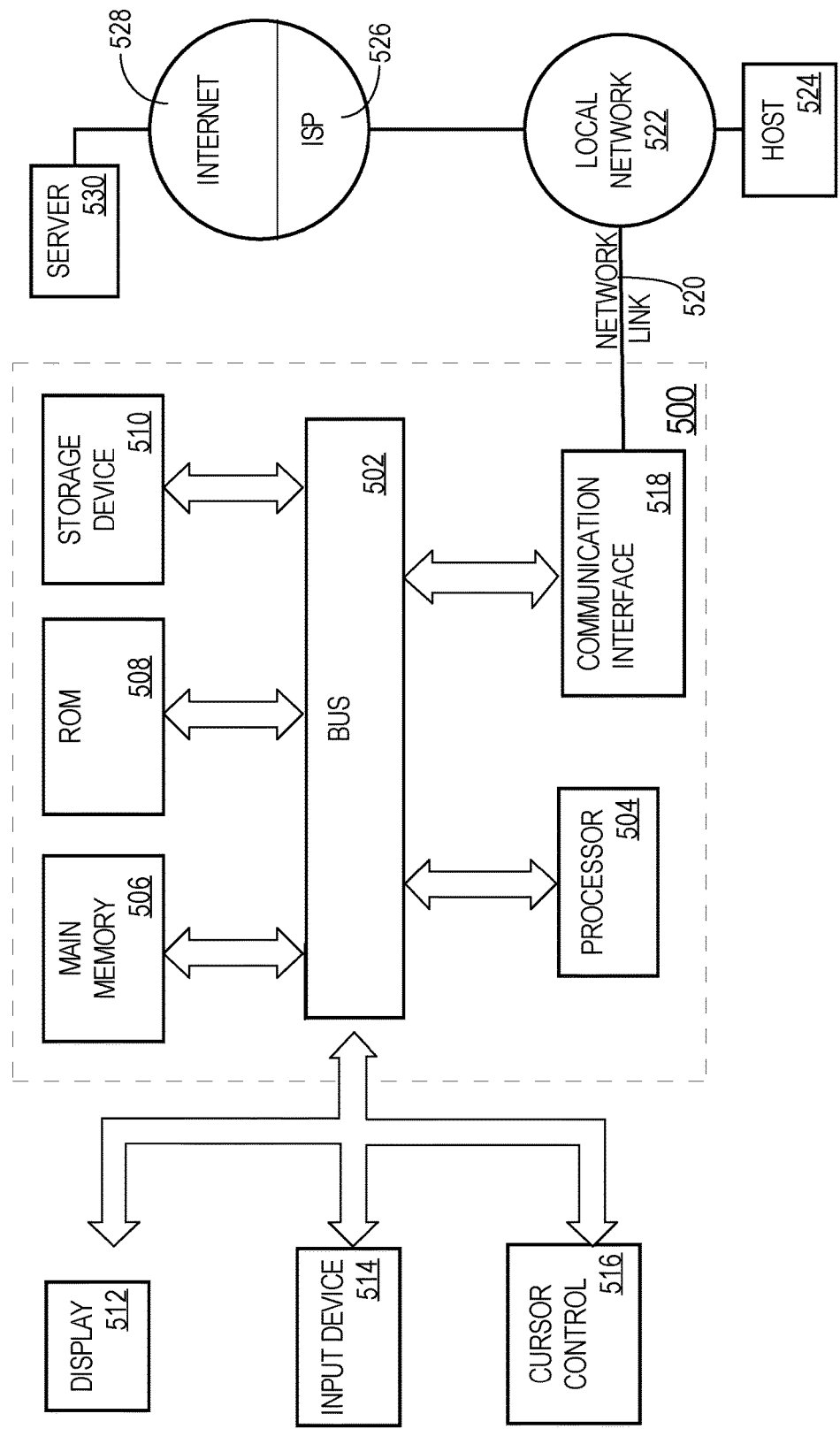
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors;
one or more storage media storing instructions which, when executed by the one or more processors, cause:
   determining, by a first process of a program in a first data center of a plurality of data centers, whether the first process is a leader process among a plurality of processes of the program,
   wherein each process of the plurality of processes of the program executes in a different data center of the plurality of data centers;
   in response to determining that the first process is the leader process, performing, by the first process, a particular task;
   after performing the particular task, causing, by the first process, leadership data to be updated to indicate that the first process is no longer the leader process;
   after the leadership data is updated, determining, by a second process, in the plurality of processes, that is different than the first process and that executes in a second data center of the plurality of data centers, whether the second process is the leader process;
   wherein the second process performs the particular task only if the second process determines that the second process is the leader process.

2. The system of claim 1, wherein determining whether the first process is the leader process among the plurality of processes comprises:
   initiating, by the first process, a first call to a leader election component associated with the first process;
   determining, by the leader election component, whether the first process is the leader process;
   in response to determining that the first process is the leader process, sending, by the leader election component, to the first process, leadership data that indicates that the first process is the leader process.

3. The system of claim 2, wherein determining, by the leader election component, whether the first process is the leader process comprises initiating, by the leader election component, a second call to a storage service that is distributed among the plurality of data centers, wherein the second call includes, as a parameter of the second call, a program indicator that indicates the program.

4. The system of claim 1, wherein the instructions, when executed by the one or more processors, further cause, prior to causing the leadership data to be updated:
   determining whether the particular task failed;
   wherein causing the leadership data to be updated is performed in response to determining that the particular task failed.

5. The system of claim 4, wherein determining whether the particular task failed comprises determining that at least a threshold number of errors occurred as a result of the first process performing the particular task.

6. The system of claim 1, wherein the instructions, when executed by the one or more processors, further cause, prior to causing the leadership data to be updated:
   determining, by the first process, based on one or more criteria, whether to update the leadership data to indicate that the first process is no longer the leader process;
   wherein causing the leadership data to be updated is performed in response to determining that the one or more criteria are satisfied;
   wherein the one or more criteria is (a) a length of time that the first process has been the leader process or (b) a number of times that the first process has performed one or more tasks.

7. The system of claim 1, wherein causing the leadership data to be updated comprises:
   moving a first data center indicator that indicates the first data center from in a first position in a list of data center indicators to a second position in the list of data center indicators, wherein the first position is different than the second position, or
   replacing a first timestamp that is associated with the first data center with a second timestamp that is different than the first timestamp.

8. The system of claim 1, wherein the instructions, when executed by the one or more processors, further cause:
   in response to the leadership data being updated in the first data center, replicating, to other instances of the leadership data in each other data center of the plurality of data centers, a change reflected in an update to the leadership data.

9. The system of claim 1, wherein the instructions, when executed by the one or more processors, further cause:
   upon startup of each process in the plurality of processes, causing, by said each process, the leadership data to be updated to indicate the data center corresponding to said each process;
   wherein an order in which the plurality of processes update the leadership data indicates which process of the plurality of processes will be the leader process.

10. The system of claim 1, wherein the instructions, when executed by the one or more processors, further cause:
    determining that a particular data center of the plurality of data centers is unavailable;
    in response to determining that the particular data center of the plurality of data centers is unavailable, removing, from the leadership data, data that is associated with the particular data center.

11. The system of claim 10, wherein the instructions, when executed by the one or more processors, further cause:
    storing first leadership data for a first program that executes in each data center of the plurality of data centers;
    storing second leadership data for a second program that executes in each data center of the plurality of data centers;
    in response to determining that the particular data center of the plurality of data centers is unavailable:
      removing, from the first leadership data, first data that is associated with the particular data center;
      removing, from the second leadership data, second data that is associated with the particular data center.

12. A method comprising:
    determining, by a first process of a program in a first data center of a plurality of data centers, whether the first process is a leader process among a plurality of processes of the program,
    wherein each process of the plurality of processes of the program executes in a different data center of the plurality of data centers;

in response to determining that the first process is the leader process, performing, by the first process, a particular task;

after performing the particular task, causing, by the first process, leadership data to be updated to indicate that the first process is no longer the leader process;

after the leadership data is updated, determining, by a second process, in the plurality of processes, that is different than the first process and that executes in a second data center of the plurality of data centers, whether the second process is the leader process;

wherein the second process performs the particular task only if the second process determines that the second process is the leader process;

wherein the method is performed by one or more computing device.

13. The method of claim 12, wherein determining whether the first process is the leader process among the plurality of processes comprises:

initiating, by the first process, a first call to a leader election component associated with the first process;

determining, by the leader election component, whether the first process is the leader process;

in response to determining that the first process is the leader process, sending, by the leader election component, to the first process, leadership data that indicates that the first process is the leader process.

14. The method of claim 13, wherein determining, by the leader election component, whether the first process is the leader process comprises initiating, by the leader election component, a second call to a storage service that is distributed among the plurality of data centers, wherein the second call includes, as a parameter of the second call, a program indicator that indicates the program.

15. The method of claim 12, further comprising, prior to causing the leadership data to be updated:

determining whether the particular task failed;

wherein causing the leadership data to be updated is performed in response to determining that the particular task failed.

16. The method of claim 15, wherein determining whether the particular task failed comprises determining that at least a threshold number of errors occurred as a result of the first process performing the particular task.

17. The method of claim 12, further comprising, prior to causing the leadership data to be updated:

determining, by the first process, based on one or more criteria, whether to update the leadership data to indicate that the first process is no longer the leader process;

wherein causing the leadership data to be updated is performed in response to determining that the one or more criteria are satisfied;

wherein the one or more criteria is (a) a length of time that the first process has been the leader process or (b) a number of times that the first process has performed one or more tasks.

18. The method of claim 12, wherein causing the leadership data to be updated comprises:

moving a first data center indicator that indicates the first data center from in a first position in a list of data center indicators to a second position in the list of data center indicators, wherein the first position is different than the second position, or replacing a first timestamp that is associated with the first data center with a second timestamp that is different than the first timestamp.

19. The method of claim 12, further comprising:

in response to the leadership data being updated in the first data center, replicating, to other instances of the leadership data in each other data center of the plurality of data centers, a change reflected in an update to the leadership data.

20. The method of claim 12, further comprising:

upon startup of each process in the plurality of processes, causing, by said each process, the leadership data to be updated to indicate the data center corresponding to said each process;

wherein an order in which the plurality of processes update the leadership data indicates which process of the plurality of processes will be the leader process.

* * * * *